Figure 2:
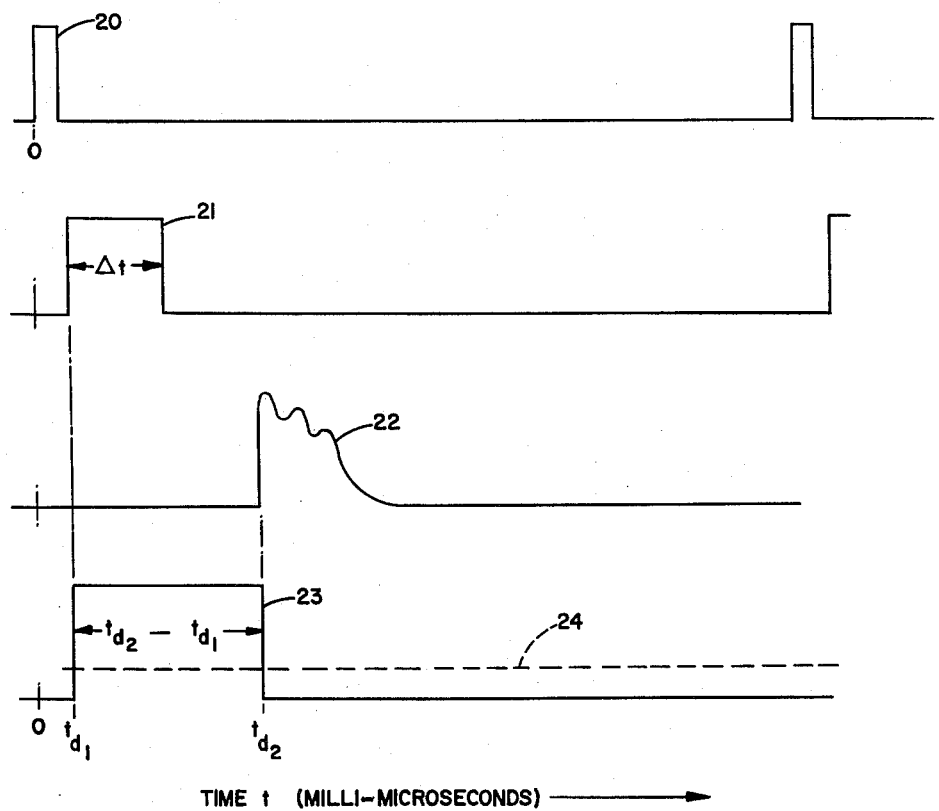

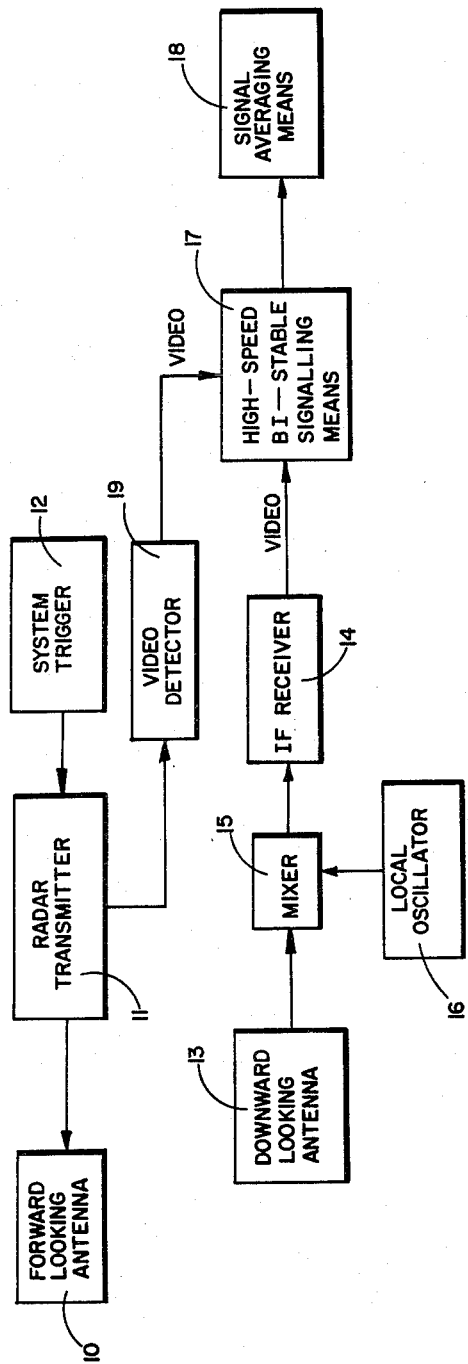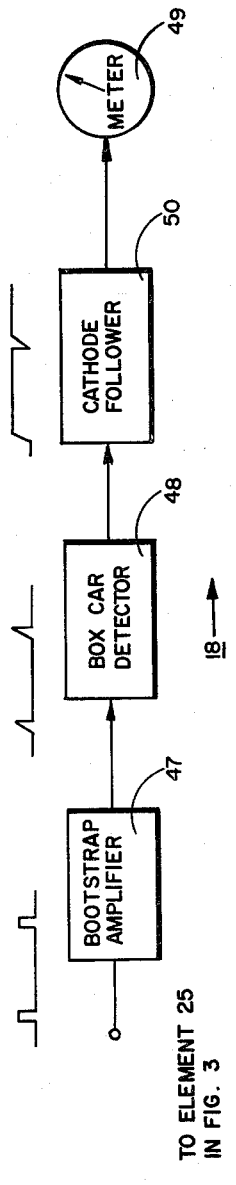

INVENTORS
CLAUDE H. CHILD
LAWRENCE R. FRASURE
BY Roy m Pitts
ATTORNEY 3,185,984
RADAR ALTIMETER
Claude H. Child, Paramount, and Lawrence R. Frasure, Anaheim, Calif., assignors to North American Aviation, Inc.
Filed Aug. 16, 1962, Ser. No. 217,367
1 Claim. (Cl. 343—17.1)

This invention relates to an improved radar altimeter, and more particularly to pulsed energy ranging means having a range resolution which is substantially independent of pulsewidth.

In the use of radar equipment in aerial vehicles, specialized equipment have been developed for each of the functions of target-ranging, ground-mapping, terrain avoidance, and altimetry. The use of several equipments for performing a multiplicity of functions has resulted in severe penalties in equipment weight and space. Therefore, it has been deemed desirable to seek multifunction equipment systems, capable of efficiently performing two or more of the required radar functions with an economy of component equipment.

Further, in employing pulsed radar systems for ranging functions such as altimetry, the performance of such systems has been limited by the pulsewidth or time duration of the pulsed energy employed. In other words, the large pulsewidth requirement associated with the available power of a given pulsed-energy source for specified effective range performance is anomalous with range resolution, in that ranges and range differences less than those represented by the pulsewidth cannot be detected.

The present invention is an improvement in pulsed energy altimeter systems in that an altimeter is provided through use of an airborne target-ranging or fire control radar, wherein the early ground return of the side lobe or spill-over energy of the tracking antenna is also used to provide altimetry information. Further, the present invention provides improved pulsed energy ranging in that the range resolution and minimum range performance of such altimeter are substantially independent of the pulsewidth of the pulsed energy employed.

In a preferred embodiment of the subject invention, there is provided a forward-looking antenna in cooperation with a pulsed energy radar system adapted for airborne use. There is also provided receiving means responsive to ground reflections of the side-lobe energy of the forward-looking antenna. Bistable means is responsively connected to both the system trigger of the pulsed energy system and return signal provided by the receiver means. The bistable means thus provides a signal the duration of which corresponds to the interval between the leading edge of a transmitted energy pulse and the leading edge of an early ground return pulse. Signal averaging means is responsively connected to the bistable signaling means for providing an analog signal indicative of the altitude of an aircraft employing such system.

Accordingly, it is an object of the subject invention to provide an altimeter receiver in cooperation with a forward-ranging radar system.

It is another object of the subject invention to provide an auxiliary altimetry function for a forward-ranging radar by means of a minimum of additional equipment.

It is still another object of the subject invention to provide a pulsed energy range measurement device having a resolution performance which is independent of the pulsewidth of the pulsed energy employed.

It is a further object of this invention to provide a passive altimeter device for cooperation with a forward-ranging pulsed radar system and having a resolution performance which is substantially independent of the pulsewidth of the pulsed energy employed.

Figure 3:
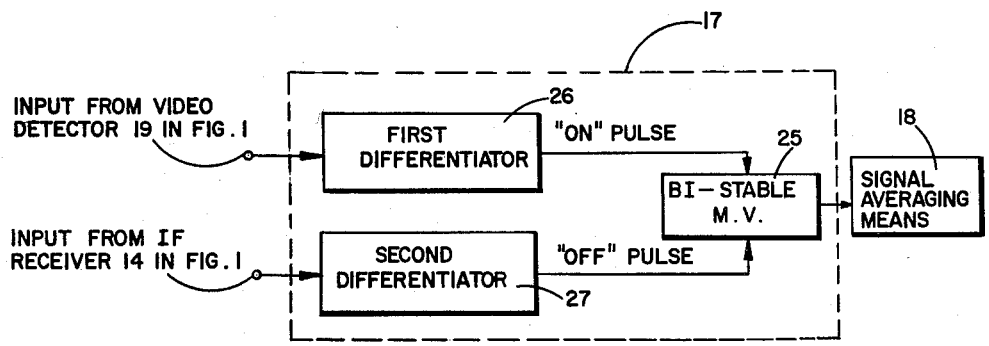
Figure 4:
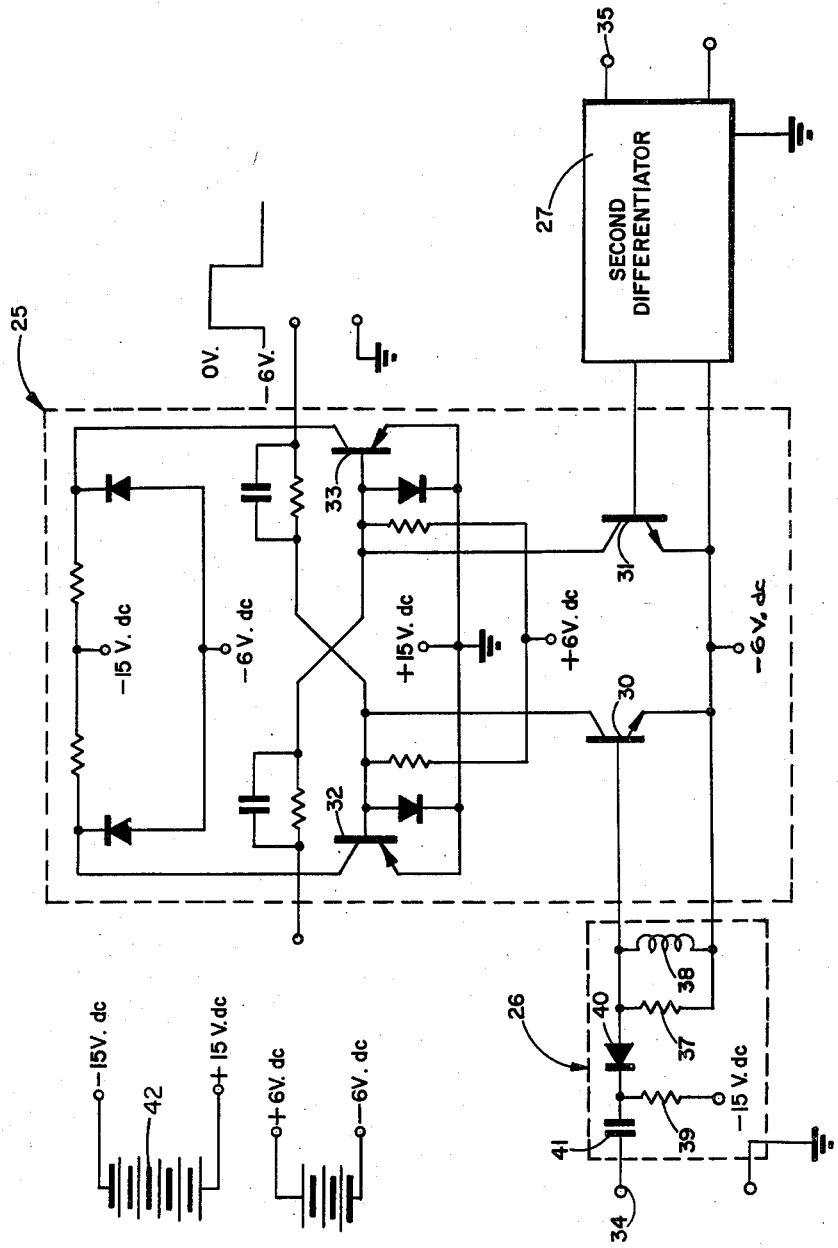

These and other objects of the invention will become apparent from the following description taken together with the accompanying drawings, in which:

FIG. 1 is a functional block diagram of a pulsed radar system employing the concept of the invention;
FIG. 2 is a time history of the response of the device of FIG. 1;
FIG. 3 is a functional block diagram of the signaling means of FIG. 1;
FIG. 4 is a preferred embodiment of the signaling means of FIGS. 1 and 3; and
FIG. 5 is a block diagram of a preferred embodiment of the signal averaging means of FIGS. 1 and 3.

Referring to FIG. 1, there is illustrated a functional block diagram of a pulsed radar system employing the concept of the invention. There is provided a forward-looking directional antenna 10, pulsed radar transmitter 11, and system trigger 12, constructed and arranged to cooperate by means well known to those skilled in the art and therefore shown in block form only. Such equipment may be part of an airborne fire-control radar system, wherein the antenna 10 is conventionally mounted in the nose of an aircraft, and oriented in a forward-looking direction. There is further provided a downward-looking directional antenna 13.

Antenna 13 is normally located sufficiently aft of the forward-looking antenna such as to achieve at least 100 decibels attenuation in the space coupling between the two antennas 10 and 13. Hence, a duplexer is not required for the protection of receiver 14, and an economy of equipment is effected. A mixer 15 is interposed between the antenna 13 and receiver 14, and is excited by a local oscillator 16 for the purpose of reducing the frequency of the signals received by antenna 13. In this way, a conventional I.F. design may be employed for receiver 14, as is usual in the art. The construction and arrangement of antenna 13, receiver 14, mixer 15, and local oscillator 16 are well known to those skilled in the art. Accordingly, these elements are shown in block form only. Receiver 14 might, for example, include an automatic frequency control means (AFC unit) for locking-on to the frequency of transmitter 11, and further include automatic gain control means (AGC unit) to reduce the effect of range (altitude) and signal strength. However, a simpler and more economical device would be a logarithmic receiver, in order to avoid the necessity of an AGC unit, and having a wide-band frequency response, thereby avoiding the necessity of an AFC unit.

A high-speed bistable device 17 is responsively connected to system trigger 12 by means of transmitter 11 and to receiver 14 for providing a two-state signal (e.g., "off" and "on") in response to the leading edge of applied inputs from elements 11 and 14. Signal averaging means 18 is responsively connected to signaling means 17 to provide an analog signal having an amplitude indicative of the pulsewidth or duration of one state of the two-state signal output from signaling means 17. Video detection means 19 is interposed between transmitter 11 and signaling means 17 to provide an acceptable form of control signal for application to the input of bistable means 17.

The operation and advantages of the device of FIG. 1 may be more readily appreciated from the time histories shown in FIG. 2.

Referring to FIG. 2, there are illustrated a family of time histories of the several elements of the device in FIG. 1. In normal operation of the above-described device, the system trigger 12 of FIG. 1 periodically provides an output signal shown at time $t_0$ as curve 20 in FIG. 2.

In response to such trigger signal, transmitter 11 generates a pluse (curve 21 in FIG. 2) of mircowave energy having a pulsewidth Δt, the leading edge of which pulse is delayed by the response time $t_{d_1}$ of the transmitter. The pulsed energy from transmitter 11 is transmitted to antenna 10 and bistable signaling means 17. Bistable signaling means 17 responds to the leading edge of the transmitted pulse at $t_{d_1}$ to provide a fixed amplitude signal (curve 23) indicative of a first state of signaling means 17.

The downwardly radiating side lobe or spill-over energy of directional antenna 10 is reflected from the ground and an early return (e.g., the ground is usually closer than targets being tracked or mapped by the conventional forward-ranging radar which includes antenna 10). This ground return (curve 22) is detected by I.F. receiver 14 in cooperation with antenna 13 as a pulse having a leading edge at $t_{d_2}$ (e.g., curve 22 at $t_{d_2}$).

Bistable signaling means 17 (curve 23 in FIG. 2) responds to the leading edge of the received pulse at $t_{d_2}$ to provide a second or "off" signal state, terminating the first signal state. Hence, the duration of the first signal state (curve 23 for the interval between $t_{d_1}$ and $t_{d_2}$) corresponds to the delay or range time of the reflected ground return energy from transmitter 11, which duration is indicative of the altitude of the airborne system above the terrain. Because of the cyclical operation of the system in response to the system trigger 12, the output from signaling means 17 will be a pulsewidth modulated, cyclical signal of fixed period and fixed amplitude. By means of signal-averaging means 18, an analog output signal (e.g., curve 24 in FIG. 2) is produced, having an amplitude which varies with the pulsewidth of curve 22. Hence, an analog signal is produced which is indicative of altitude.

It is to be understood that the performance of the device of FIG. 1, in being responsive to the leading edge of the transmitted and received energy pulses, is not limited by the pulsewidth of such pulses, nor subject to calibration errors due to delays in the response of the transmitter to the system trigger. The structure by which such response is achieved is shown generally in FIG. 3.

Referring to FIG. 3, there is illustrated a block diagram of the signaling means of FIG. 1. Signaling means 17 comprises a bistable multivibrator 25 having a first and second input responsively connected to transmitter 11 and I.F. receiver 14 for providing an "on" and an "off" signal, respectively. Interposed between multivibrator 25 and the first and second inputs thereto is a first and second differentiator 26 and 27 respectively. In operation of the combination illustrated in FIG. 3, first differentiator 26 provides a first input to turn on multivibrator 25. This input has a peak amplitude which occurs at the leading edge of the output from trasmitter 11, and is of very short duration (relative to the pulsewidth of the output from transmitter 11). Hence, multivibrator 25 is turned on in response to only the leading edge of the input from transmitter 11. Similarly, second differentiator 27 provides a second input to turn off multivibrator 25, which input has a peak amplitude of short duration occurring at the leading edge of the output from receiver 14. The analog signal averaging means for providing and/or utilizing the pulsewidth modulated output from signaling means 17 may be a voltmeter connected in shunt across a load impedance, and having a dynamic response which is preferably at least critically damped and limited to frequencies substantially below the frequency or repetition rate of the system trigger 12 in FIG. 1. In this way, a visual indication is provided to a human observer or pilot. Another form of signal averaging device might be a load resistor with a shunt capacitor, the value of the capacitor being selected to define a first order time constant substantially longer than the period of the above-described system trigger. In this way, an electrical analog signal is developed which may be utilized by a pitch control autopilot or other signal utilization means. Accordingly, signal averaging means 18 is shown in block form only.

While the response of the system to pulsed energy has been shown to be independent of the pulsewidth of such energy, yet there is little practical point in achieving such improvement in system resolution and minimum range performance unless the accuracy of the system (e.g., its freedom from errors due to the drift of inherent response delays) is commensurate with the improved resolution thus achieved. For example, there is no point to attempting to employ the system in an automatic landing system to measure altitudes as low as 25 feet with a resolution of ±10 feet, if changes or drift in system calibration can produce errors of as much as ±30 feet.

While delays in the signaling means and in the rest of the system described in FIGS. 1 and 3 may be compensated for by calibration (in the case of a visual indicator) or by the use of bias signal sources (in the case of electrical signal utilizing means), such compensation is often ineffective because the delay sources within the signaling system are subject to drift or change. Therefore, a preferable means of reducing system error due to drift is to avoid the inclusion of unstable delay-producing elements. A means of avoiding calibration errors due to drift in the delay $t_{d_1}$ of the transmitter response to the system trigger has been described above, for example, in making signaling means 17 directly responsive to transmitter 11 in FIG. 1, and hence only indirectly responsive to system trigger 12. Delays in the mixer 15 and receiver 14 of FIG. 1 are nominally about 50 millimicroseconds (corresponding to about 25 feet), but are extremely stable (e.g., to within ±20% or ±5 feet). Therefore, such drift can be effectively compensated for. One means of compensating for such delay in the receiver circuit is to include an adjustable delay line in the mechanization of video detector 19 whereby a like delay can be inserted in the output of video detector 19. In this way, the leading edges of both inputs to signaling means 17 are delayed a like amount, and the time difference between them is substantially only that which occurs due to the range time interval or altitude.

Referring to FIG. 4 there is illustrated a preferred embodiment of the bi-stable signaling means of FIGS. 1 and 3. A non-saturating multivibrator is employed in conjunction with an input signal peaking circuit 26 and 27 for each of the two inputs of the non-saturating multivibrator. A non-saturating bi-stable multivibrator circuit is preferred over a saturating multivibrator because of the increased response time of the latter component in entering and leaving saturation. This incremental response time would serve to increase or worsen the minimum altitude and altitude resolution performance available from an altimeter system employing such latter component.

Non-saturating multivibrator 25 is comprised of a first and second type NPN input transistor 30 and 31, operatively connected to drive first and second type PNP transistors 32 and 33 respectively, into a first or conductive state. In other words, first and second output transistors 32 and 33 assume mutually exclusive ones of said first conductive and second non-conductive states.

A first and second control signal input terminal 34 and 35 is operatively connected to the base of transistor 30 and 31, respectively. A first fast-peaking signal circuit or differentiator 26 is interposed between terminal 34 and the base of transistor 30. A second fast-peaking signal circuit or differentiator 27 is interposed between terminal 35 and the base of transistor 31. Peaking circuits 26 and 27 are similarly constructed and arranged; therefore, a description of one will suffice to describe them both.

First-peaking circuit 26 is comprised of first resistor 37 and inductor 38 connected in parallel across the base and emitter of transistor 30. A second resistor 39 interconnects the base of transistor 30 and the negative terminal of a first source 42 of D.-C. potential. Interposed in series circuit between resistor 39 and the base of transistor 30 is a diode 40 having its cathode connected to resistor 39 and its anode to the base of transistor 30. A capacitor 41 interconnects input terminal 34 and the cathode of diode 40.

In normal operation of the device of FIG. 4, a video pulse of positive sense is applied at first input terminal 34, to turn on the device. Capacitor 41 transmits a positive going spike, corresponding to the transient response or the leading edge of the pulse input, to the cathode of diode 40. This tends to back-bias diode 40, causing the currents through paralleled resistor 37 and inductance 38 to tend to drop. The rate of change of current through inductor 38 produces a transient back "E.M.F." or induced voltage spike of positive sense at the base of transistor 30, thereby causing the emitter-collector circuit of transistor 30 to become temporarily conductive. Conductive transistor 30 thereby tends to turn on first output transistor 32, which tends to turn off second output transistor 33, whereby first output transistor 32 assumes a conductive state and second output transistor 33 assumes a non-conductive state.

Upon the termination of the input pulse on input terminal 34, capacitor 41 transmits a negative going spike. This signal transient or spike has no effect on transistor 30, however, because of a negative signal clipping action provided by diode 40.

Upon the subsequent application of an input pulse to terminal 35, second input transistor 31 responds to the leading edge of such pulse to turn on second output transistor 33, whereby first output transistor 32 is shut off in a manner similar to the explanation of the shutting off of transistor 33 in response to the application of a positive pulse to input terminal 34. Accordingly, a two-state signal is produced at output transistor 32, the duration of the "on" state corresponding to the interval between an input on terminal 34 and a subsequent input on terminal 34.

Signal averaging means 18 is provided for the generation of an analog output signal having a magnitude indicative of the pulsewidth of the cyclical pulsewidth-modulated signal from multivibrator 25. A preferred embodiment of signal averaging means 18 is shown in FIG. 5.

Referring to FIG. 5, there is illustrated a block diagram of a preferred embodiment of the signal averaging means of FIGS. 1 and 3. There is provided means 47 responsive to a cyclical, pulsewidth-modulated input signal for providing a cyclical unipolar ramp function signal having a peak value indicative of the on-time interval or duration of the two-state input signal. Such means may be provided, for example, by a bootstrap amplifier, the construction and arrangement of which are described at pages 11-8 and 11-9 of "Electronic Designers Handbook," published by McGraw-Hill (1957). Therefore, element 47 is shown in block form only.

There is further provided a box car detector 48 or other means well known in the art for providing a continuous output signal indicative of the peak value of a cyclical unipolar input signal. Such continuous signal may be applied to a voltmeter 49 or other signal utilizing means. However, a cathode follower 40 is preferably interposed between such signal utilizing means and detector 48 in order to provide impedance isolation of the impedance of the signal utilizing means from detector 48. In this way, the accuracy of the continuous signal from detector 48 is preserved. The construction of box car detector 48 and cathode follower 49 being well known to those skilled in the art, these elements are shown in block form only.

Hence, it is to be appreciated that improved pulsed energy altimetry means is provided, the performance of which is not limited by the pulsewidth of the pulsed energy employed.

Although the invention has been described and illustrated in detail, it is to be clearly understood that the same is by way of illustrtaion and example only and is not to be taken by way of limitation, the spirit and scope of this invention being limited only by the terms of the appended claim.

We claim:

In a pulsed radar system adapted for airborne use and having a transmitter, a forward-looking antenna producing side-lobe energy which radiates downwardly, and a system trigger, the combination comprising a downward-looking directional antenna responsive to ground reflections of said downwardly radiated side-lobe energy and located aft of said forward-looking antenna by an amount representing at least 100 decibels attenuation in the forward-looking antenna radiation pattern;

a radar receiver responsively connected to said downward-looking antenna;

a non-saturating bistable multivibrator having a first and second input;

a first and second normally non-conductive switching transistor, each having an emitter-collector circuit interposed at a respective one of said inputs to said multivibrator;

a control electrode of said first transistor being responsively coupled to the transmitter as a control input for inducing a first state in said bistable multivibrator, and a control electrode of said second transistor being responsively coupled to said receiver as a control input for inducing a second state in said multivibrator, a first fast-peaking signal circuit interposed between said transmitter and said first transistor;

a second fast-peaking signal circuit interposed between said receiver and said second transistor;

each said fast-peaking signal circuit comprising a shunt resistor and shunt inductor commonly interconnecting the control electrode and emitter electrode of said transistor, a diode conductively connecting said control electrode to a source of potential for non-conductively biasing said transistor, a blocking capacitor connected in series with said diode for interconnecting a control input thereto;

a bootstrap amplifier responsive to said multivibrator for providing a cyclically increasing unipolar output signal having a peak amplitude indicative of the duration of the first state of said multivibrator; and a boxcar detector responsively coupled to said bootstrap amplifier for providing an output signal indicative of the peak value of the cyclical unipolar output thereof.

References Cited by the Examiner
UNITED STATES PATENTS

| | | | |
|---|---|---|---|
| 2,421,018 | 5/47 | De Rosa | 343—13 |
| 2,485,584 | 10/49 | Ginzton | 343—13 |
| 2,500,638 | 3/50 | Krauth | 343—13 X |
| 3,095,564 | 6/63 | Cartwright | 343—13 |

CHESTER L. JUSTUS, *Primary Examiner.*